(No Model.) 2 Sheets—Sheet 1.
L. W. HARDY.
ANTI-FRICTION BEARING.
No. 452,373. Patented May 19, 1891.
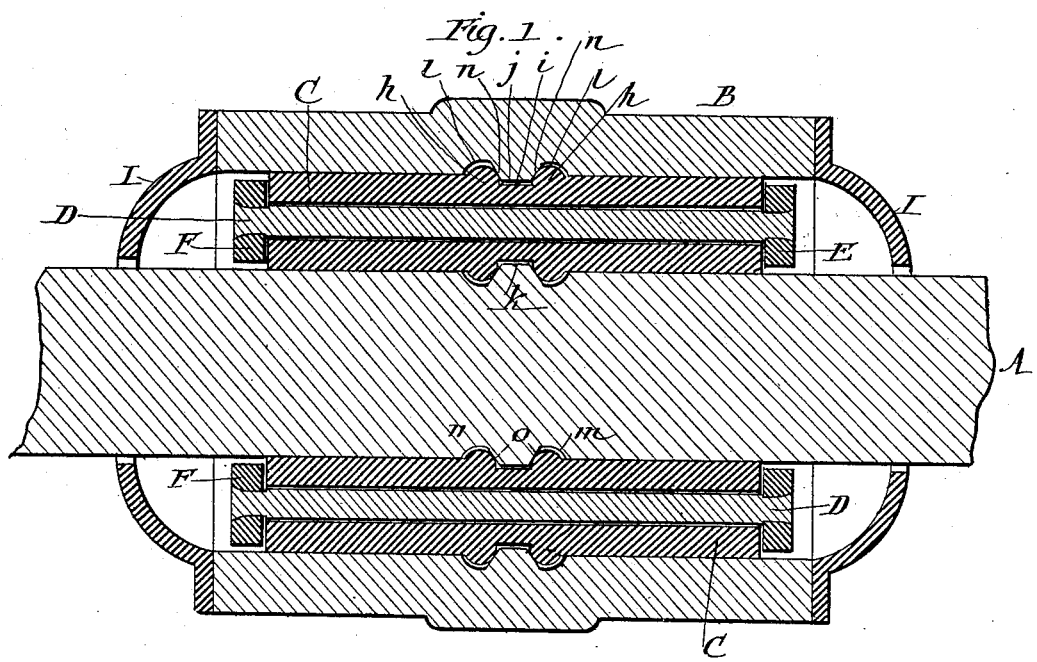
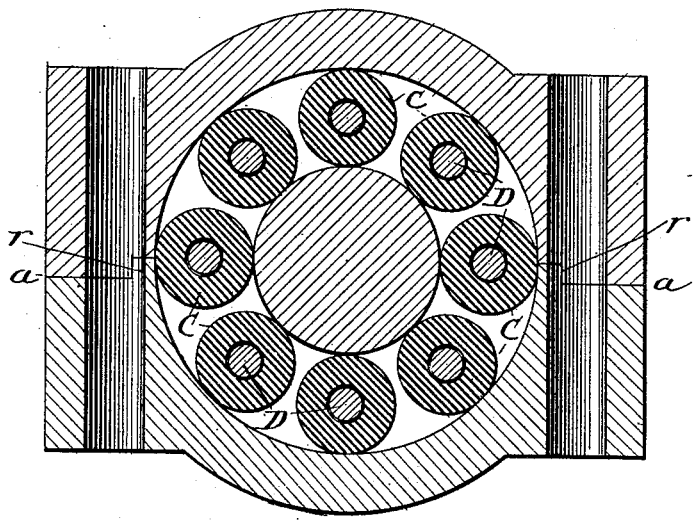
Witnesses:
Harry T. Jones
Albert H. Adams
Inventor:
Lewis W. Hardy (No Model.) 2 Sheets—Sheet 2.

L. W. HARDY.
ANTI-FRICTION BEARING.

No. 452,373. Patented May 19, 1891.

Witnesses:
Harry T. Jones.
Albert H. Adams.

Inventor:
Lewis W. Hardy

UNITED STATES PATENT OFFICE.

LEWIS W. HARDY, OF CHICAGO, ILLINOIS, ASSIGNOR TO THE ROLLER BEARING AXLE COMPANY, OF HILLSBOROUGH, WISCONSIN.

ANTI-FRICTION BEARING.

SPECIFICATION forming part of Letters Patent No. 452,373, dated May 19, 1891.

Application filed March 21, 1890. Serial No. 344,750. (No model.)

*To all whom it may concern:*

Be it known that I, LEWIS W. HARDY, residing at Chicago, in the county of Cook, in the State of Illinois, and a citizen of the United States, have invented a new and useful Improvement in Anti-Friction Bearings, of which the following is a specification, reference being had to the accompanying drawings, in which—

Figure 3:
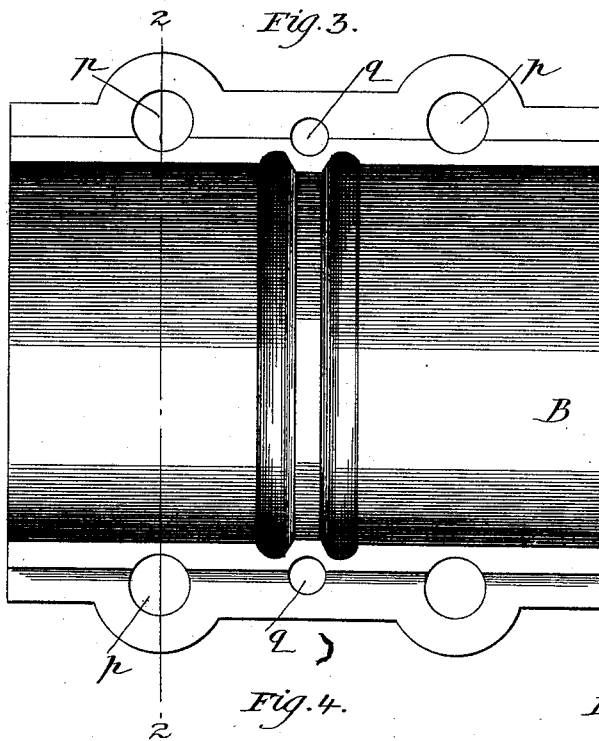
Figure 6:
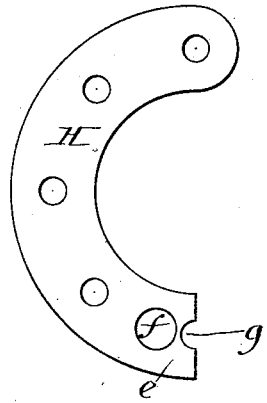
Figure 4:
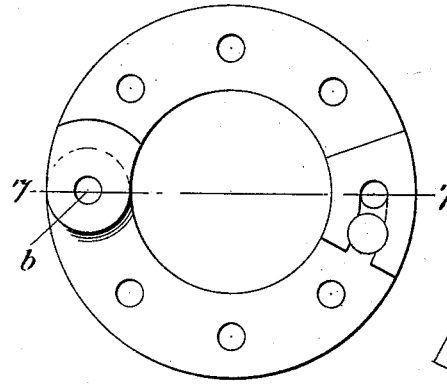
Figure 5:
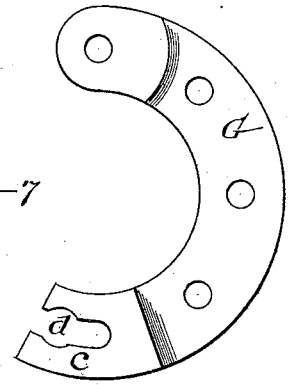
Figure 7:

Figure 1 is a vertical section. Fig. 2 is a section at line 2 of Fig. 3. Fig. 3 is an inside view of one part of the box. Fig. 4 is a plan showing one of the rings which receive the shafts of the anti-friction rollers. Fig. 5 is a side view of one half of the ring shown in Fig. 4. Fig. 6 is a side view of the other half. Fig. 7 is a section at line 7 of Fig. 4.

My improvement relates to bearings which are provided with anti-friction rollers, and is primarily designed for bearings which are used with line-shafting. The provision which has heretofore been made for the end thrust or movement has been faulty.

The object of my invention is to provide novel means for counteracting the endwise thrust of a shaft to reduce friction and avoid undue wearing of the parts. To accomplish this object my invention involves the features of construction, the combination or arrangement of devices, and the principles of operation hereinafter described and claimed.

In the drawings, A represents a shaft.

B is the box, which is to be made in two parts bolted together, as usual, except that I have divided the box on an irregular line $a$, as shown in Fig. 2.

C are a number of rollers, each on a pin D, the ends of which pins are secured by riveting or otherwise in rings E F. These rings are made in two parts G H, pivoted together at $b$ on one of the pins D. The other end $c$ of the part G is provided with a slot $d$ of the form shown in Fig. 5, and the corresponding end $e$ of the other part H is provided with a hole $f$ and with a recess $g$. When the two ends $c$ and $e$ are brought together, the slot $d$ passes over the end of one of the pins D, and the two ends of the ring can be secured together by means of a pin or screw passing through the hole $f$ and the enlarged part of the slot $d$.

$h$ are ball-beads, two of which are provided on the periphery of each of the rollers C. Between these two beads the roller is recessed or cut away, as shown at $i$.

On the inside of the box there is an angular projection $j$, which extends beyond the normal inner wall of said box and fits into the space between the ball-beads of the rollers, and there is a similar projection $k$ on the exterior of the shaft, which extends beyond the normal diameter thereof, and which also fits the space between the beads on the rollers. The interior of the box is also provided with recesses $l$, and the exterior of the shaft is provided with similar recesses $m$ to receive the beads on the rollers. The beads do not touch the walls of these recesses $l$ $m$, but come in contact with the angular walls $n$ of the projections $j$ on the interior of the box and also with the angular walls O of similar projections $k$ on the shaft, the meeting-points between the beads and these angular walls being on a line with the periphery of the rollers.

It will be observed that in my improved construction and arrangement the points of contact of the ball-beads $h$ with the shaft A are in alignment with the bearing of the roller against the shaft, whereby the travel at the point of contact of the ball-beads is coextensive or exactly the same as the travel of the rollers. If such points of contact are not thus arranged, the ball-beads necessarily wear or grind, which not only increases the friction, but as soon as the surface is worn sufficient to make the difference in travel appreciable the ball-beads or projection wear very rapidly. There is no contact between the beads, the box, and the shaft, except on a line with the peripheries of the shaft and rollers.

$p$ are holes to receive bolts which hold the two parts of the box together.

$q$ are holes for dowel-pins, which, together with the shoulders in the box, (shown at $r$ in Fig. 2,) prevent all movement of these parts on each other.

I are caps, one at each end of the box.

What I claim as new, and desire to secure by Letters Patent, is as follows:

1. The combination, with a box B and a shaft A, having an annular beveled projection $k$ extending beyond the normal diameter thereof, and an annular recess *m* at each side of and adjoining the beveled projection, of the rollers C, provided with the ball-beads *h*, engaging the beveled projection and having their sole points of contact with the shaft located in alignment with the travel of the rollers at their bearing on the shaft, substantially as and for the purpose described.

2. The combination, with a box B, having an annular beveled projection *j* extending beyond the inner wall thereof, and a shaft A, having an annular beveled projection *k* extending beyond the normal diameter thereof, and annular recesses *m* and *l* at each side of and adjoining the said beveled projections, of the rollers C, provided with the ball-beads *h*, engaging the beveled projections and having their sole points of contact located in alignment with the travel of the rollers at their bearing on the inner wall of the box and on the shaft, substantially as and for the purpose described.

LEWIS W. HARDY.

Witnesses:
HARRY T. JONES,
ROBERT A. MILLAR.